Mar. 6, 1923.
J. THALHEIMER.
FILE.
FILED SEPT. 20, 1922.
1,447,910.
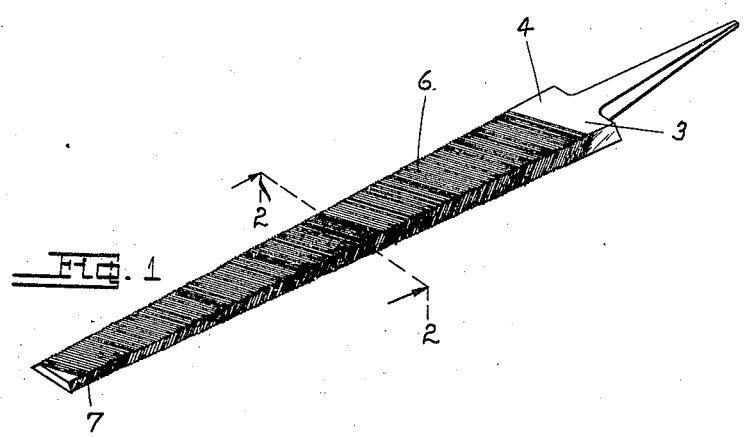
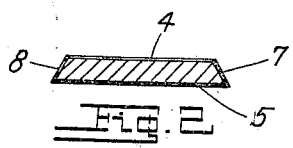
Inventor
Joseph Thalheimer
By Walter F. Murray
Attorney Patented Mar. 6, 1923.

1,447,910

UNITED STATES PATENT OFFICE.

JOSEPH THALHEIMER, OF SUNMAN, INDIANA.

FILE.

Application filed September 20, 1922. Serial No. 589,490.

*To all whom it may concern:*

Be it known that I, JOSEPH THALHEIMER, a citizen of the United States of America, and a resident of Sunman, in the county of Ripley and State of Indiana, have invented a new and useful Improvement in a File, of which the following is a specification.

An object of my invention is to provide a simple and efficient general utility file.

Another object of my invention is to provide a file which is especially adapted to the sharpening of saws of various kind.

These and other objects are attained by means described herein and disclosed in the accompanying drawing, in which:

Fig. 1 is a perspective view of a file embodying my invention.

Fig. 2 is a sectional view on line 2—2 of Fig. 1.

The file 3 of my invention comprises preferably an elongated flat body and carries upon its two opposite sides 4 and 5, transversely extending teeth 6. The longitudinal edges 7 and 8 carry file teeth and are inclined to one of the sides, such as 5, at an angle of substantially sixty degrees.

Files made as disclosed herein provide a filing surface which may extend over a given cutting surface of a saw tooth, and may be reciprocated over said saw tooth surface without mutilating the adjacent saw tooth. Heretofore when using files as were to be had in the art, the angles at which the cutting surfaces of the saws were disposed, were substantially modified with a very limited sharpening of the teeth, whereby the efficiency and utility of the saw were greatly impaired. When using a device such as disclosed by me, the teeth will retain their original heights and depths, and these proportions will not be subject to ready modification, although inexperienced persons sharpen the saw.

What I claim is:

A file having a flat elongated form, file teeth on its opposite sides, and having longitudinal filing edges extending from one of said sides at an angle of substantially sixty degrees.

In testimony whereof, I have hereunto subscribed my name this 18th day of September, 1922.

JOSEPH THALHEIMER.